(12) United States Patent
Liu et al.

(10) Patent No.: US 11,199,654 B2
(45) Date of Patent: Dec. 14, 2021

(54) LIGHTGUIDE HAVING RECESS OF VARYING DEPTH

(71) Applicant: 3M INNOVATIVE PROPERTIES COMPANY, St. Paul, MN (US)

(72) Inventors: Tao Liu, Woodbury, MN (US); Yongshang Lu, Woodbury, MN (US); David C. Mercord, Prescott, WI (US); Brian W. Ostlie, Hudson, WI (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 16/632,471

(22) PCT Filed: Aug. 1, 2018

(86) PCT No.: PCT/IB2018/055787
§ 371 (c)(1),
(2) Date: Jan. 20, 2020

(87) PCT Pub. No.: WO2019/030619
PCT Pub. Date: Feb. 14, 2019

(65) Prior Publication Data
US 2020/0233135 A1 Jul. 23, 2020

Related U.S. Application Data

(60) Provisional application No. 62/542,453, filed on Aug. 8, 2017.

(51) Int. Cl.
 *F21V 8/00* (2006.01)
(52) U.S. Cl.
 CPC ........... *G02B 6/002* (2013.01); *G02B 6/0018* (2013.01)

(58) Field of Classification Search
 CPC .. G02B 6/0013; G02B 6/0016; G02B 6/0018; G02B 6/002; G02B 6/0028;
 (Continued)

(56) References Cited

U.S. PATENT DOCUMENTS

| 6,474,826 B1* | 11/2002 | Tanaka | G02B 6/0018 |
| | | | 362/23.16 |
| 6,592,233 B1* | 7/2003 | Parikka | G02B 6/0028 |
| | | | 362/23.15 |

(Continued)

FOREIGN PATENT DOCUMENTS

| CN | 203275693 | 11/2013 |
| JP | 2009-259557 | 11/2009 |

OTHER PUBLICATIONS

International Search Report for PCT International Application No. PCT/IB2018/055787, dated Nov. 12, 2018, 5 pages.

*Primary Examiner* — Elmito Breval
*Assistant Examiner* — Steven Y Horikoshi
(74) *Attorney, Agent, or Firm* — Jonathan L. Tolstedt

(57) ABSTRACT

An optical system comprises a lightguide having an elongated recess formed therein. The recess divides the lightguide into a first lightguide section a second larger lightguide section. Light extractors are disposed in the second, but not the first, lightguide section for extracting light that would otherwise propagate within and along the second lightguide section via total internal reflection (TIR). The depth of the recess varies along its length. The inclusion of a recess having a depth that varies along its length provides design flexibility in the number and location of light source(s) used by the optical system.

9 Claims, 5 Drawing Sheets

(58) Field of Classification Search
CPC .... G02B 6/0078; G02B 6/008; G02B 6/0038; G02B 6/0046; G02B 6/0061
See application file for complete search history.

(56) References Cited

U.S. PATENT DOCUMENTS

| | | | |
|---|---|---|---|
| 8,358,266 B2 | 1/2013 | Khazeni | |
| 2005/0180165 A1* | 8/2005 | Sado | G02B 6/0028 362/606 |
| 2005/0276566 A1* | 12/2005 | Iimura | G02B 6/0018 385/146 |
| 2009/0201301 A1* | 8/2009 | Mienko | G02B 6/0018 345/501 |
| 2010/0008103 A1 | 1/2010 | Lee | |
| 2010/0214508 A1 | 8/2010 | Ouchi | |
| 2011/0170316 A1* | 7/2011 | Overes | G02B 6/0028 362/615 |
| 2012/0075555 A1* | 3/2012 | Parker | G02B 6/008 349/62 |
| 2014/0063853 A1 | 3/2014 | Nichol | |
| 2014/0204611 A1* | 7/2014 | Yang | G02B 6/0038 362/611 |
| 2014/0211503 A1 | 7/2014 | Tarsa | |
| 2016/0363769 A1 | 12/2016 | Masuda | |
| 2017/0075119 A1 | 3/2017 | Schultz | |

* cited by examiner

LIGHTGUIDE HAVING RECESS OF VARYING DEPTH

TECHNICAL FIELD

This disclosure relates generally to light guides.

BACKGROUND

Lightguides can be used to provide illumination for various applications. For example, lightguides have been used in display backlights, general lighting, and automotive tail lamps. A plurality of light sources may be distributed along an end of the lightguide to provide light into the lightguide, and the lightguide may include light extraction features for extracting the light from the lightguide.

Multiple light emitting diodes (LEDs) are typically arranged along one or two ends of the area lightguide for light injection. The number of LEDs and their spacing are typically determined by the total amount of light and spatial uniformity needed for a given application. The LEDs are typically installed directly adjacent to the lightguide and light is input into the lightguide via butt-coupling. Assembly of such systems can be complex, especially when using flexible lightguides, and the cost can be high due to the number of LEDs needed.

SUMMARY

The present invention includes an optical system comprising a lightguide having an elongated recess formed therein having a length L1 and a width W1. The length L1 is greater than or equal to five times the width W1. The recess has first and second depths, D1 and D2, in a thickness direction (z) of the lightguide at respective first and second locations along the length of the recess. Depth D2 is greater than or equal to 1.5 times the depth D1. The recess divides the lightguide into a first lightguide section having a major surface having an area A1 and a second lightguide section having a major surface having an area A2, wherein area A2 is greater than or equal to area A1. Light extractors may be disposed in the second, but not the first, lightguide section for extracting light that would otherwise propagate within and along the second lightguide section.

Area A2 may be greater than or equal to 5, 10, 20, 50, or 100 times the size of area A1. The recess's length L1 may be greater than or equal to ten times the width W1 of the recess. Length L1 may also be greater than or equal to 50 or 100 times width W1. The recess's depth D2 may be greater than or equal to three, five, or ten times depth D1.

The lightguide has a thickness T and the recess has a maximum depth Dmax such that Dmax is greater than or equal to one half of thickness T. The recess's depth Dmax may be greater than or equal to 70% or 90% of thickness T, and may even be equal to thickness T (so that the recess extends through the entire thickness of the lightguide at that point). Depths D1 and D2 may both be less than thickness T. Alternatively, depth D2 may be equal to thickness T (so that the recess extends through the entire thickness of the lightguide at that point).

The optical system may include opposing first and second major surfaces, where the elongated recess is formed in the first major surface and extends toward the second major surface, and where at at least one location along the length of the recess, the depth of the recess extends to the second major surface.

The lightguide may include an emission surface opposite a back surface. Light propagating within and along the second lightguide section is extracted by at least one of the light extractors and exits the lightguide from the emission surface. The recess may be formed in the emission surface and extend toward the back surface, or the recess may be formed in the back surface and extend toward the emission surface.

In another embodiment, the lightguide has an index of refraction n1 and the recess is at least partially filled a filler material having an index of refraction index n2 which is less than n1.

The light extractors may include protrusions formed on an exterior surface of the lightguide. Alternatively, the light extractors may include notches formed in the exterior surface of the lightguide. Alternatively, the light extractors may be embedded within the lightguide.

The cross-sectional profile along the length of the lightguide may be round, circular, elliptical, mushroom-shaped, rectangular, or a square. The lightguide may be substantially flat or curved in at least one direction.

The lightguide may have a width W2 at the recess. The length L1 of the recess may be greater than or equal to 50%, 70%, or 90% of width W2. In fact, if the lightguide is curved, it may be longer than width W2, such as greater than or equal to 20% longer.

The recess generally has two opposite ends along its length. At least one of the ends is closed, meaning that it is within the lightguide. In another embodiment, at least one of the recess ends may be open, meaning that it opens to the side of the light guide. Or both ends of the recess may be closed or open.

The depth d of the recess varies along at least a portion of its length. The depth profile of the recess over its length may be continuously varying, linear, non-linear, piece-wise, and/or may be defined by adjoining curved surfaces.

The elongated recess may have a first side surface facing the first lightguide section and an opposing second side surface facing the second lightguide section. At least one of the side surfaces may make an angle (θ1, θ2) with respect to a normal to the lightguide that is less than about 20 or 30 degrees. At least one of the two side surfaces may be substantially planar or curved.

In another embodiment, the lightguide comprises at least one auxiliary elongated recess formed in the second lightguide section for receiving light from the first lightguide section along a first direction and redirecting the received light along a different second direction in the second lightguide section. The elongated auxiliary recess may be located proximate a first edge of the lightguide and at least one other auxiliary elongated recess may be formed in the second lightguide section proximate an opposite second edge of the lightguide.

The depth of the auxiliary elongated recess(es) may have a maximum depth hmax which is greater than or equal to 50%, 60%, 70%, or 90% of the thickness T of the lightguide, or hmax can be equal to T (meaning that the auxiliary recess extends through the entire thickness of the lightguide).

The optical system may further include a light source disposed along a first edge of the first lightguide section. A first light ray emitted by the light source may enter the first lightguide section through the first edge and then leave the first lightguide section and enter the second lightguide section after being reflected at least once by the elongated recess. Also, in some cases at least one light ray from the light source may leave the first guide section and enter the second lightguide section without encountering the elongated recess.

The present invention also includes a lightguide comprising an elongated recess continuously extending along a length L1 of the elongated recess from a first end of the elongated recess to an opposing second end. The lightguide has a thickness T and a width W2 at the recess. The recess has a maximum depth Dmax. The lightguide has dimensions that satisfy the equation L1≥0.5 W2 and Dmax≥0.5 T.

The present invention also includes a lightguide comprising an elongated recess continuously extending along a length L1 of the elongated recess, and having a depth d that increases from a first end of the elongated recess proximate a first edge of the lightguide to an opposing second end of the elongated recess proximate an opposite second edge of the lightguide. The separation between the first end of the recess and the first edge of the lightguide, and/or the separation between the second end of the recess and the second edge of the lightguide is less than about 50%, 40%, 30%, 20%, or 10% of the length L1 of the recess.

The lightguides described herein may be unitary lightguides, as defined herein.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DESCRIPTION OF ILLUSTRATIVE EMBODIMENTS

Figure 1:
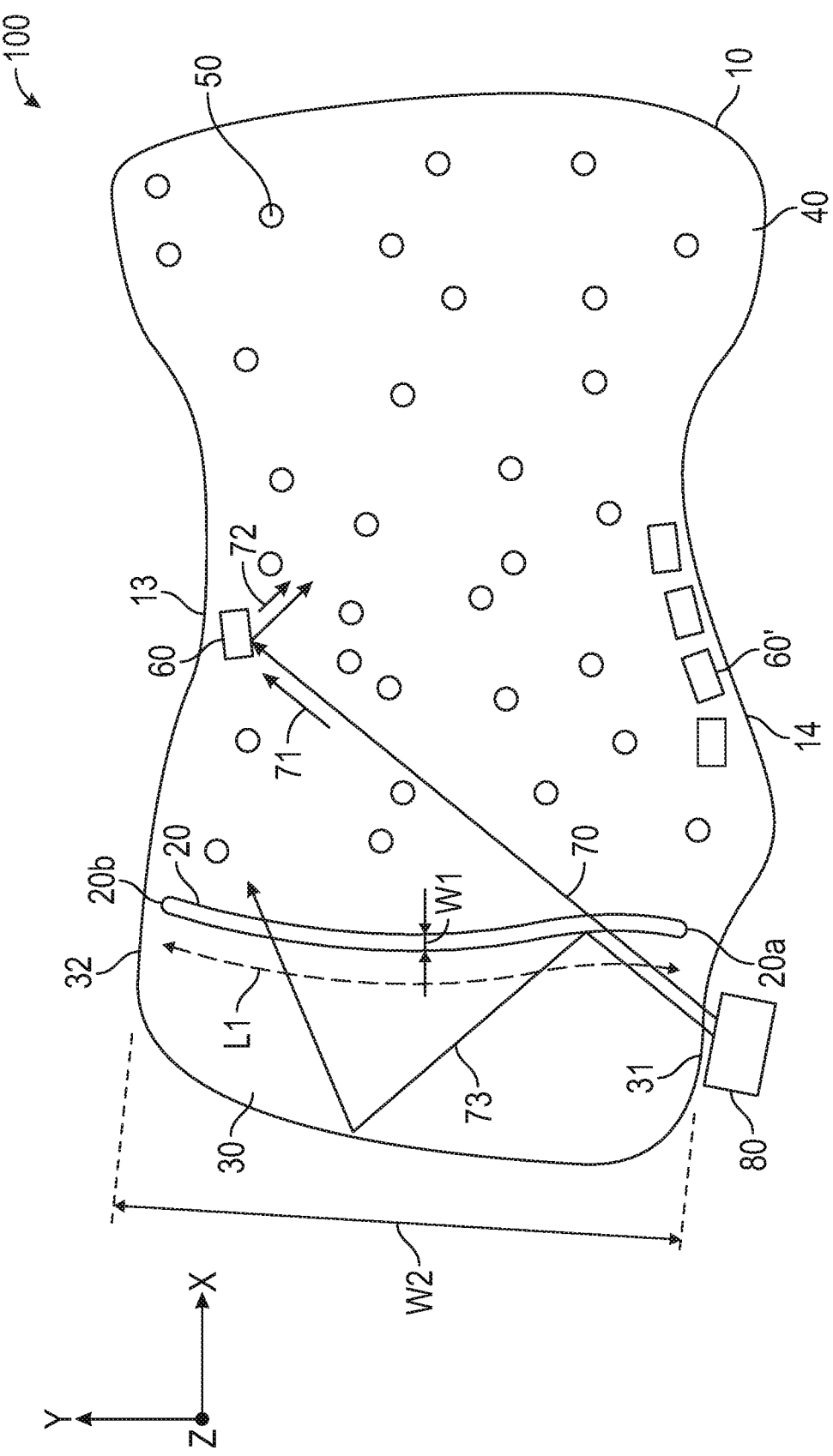
FIG. 1 is a schematic top view of optical system 100 according to one embodiment of the present invention.

An optical system 100 according to one embodiment of the present invention is shown in FIG. 1. System 100 includes a lightguide 10 and may include a light source 80, which is typically a light emitting diode (LED). Lightguide 10 has an elongated recess 20 formed therein having a length L1 and a width W1. Elongated recess 20 is long compared to its width, so that L1/W1≥5, 10, 50, or even 100. As shown in FIG. 1, the length L1 of recess 20 is less than the width W2 of lightguide 10 in the vicinity of the recess. The ratio L1/W2 may be greater than or equal to 0.5, 0.7, or 0.9.

Recess 20 has a depth that varies along its length. Recess 20 divides lightguide 10 into a first lightguide section 30 having a major surface having an area A1 and a second lightguide section 40 having a major surface having an area A2. Area A2 is greater than or equal to area A1, and may be 5, 10, 20, 50, or 100 greater than the size of area A1. Recess 20 extends from recess end 20a proximate first edge 31 of first lightguide section 30 of lightguide 10 to recess end 20b proximate second edge 32 of the first lightguide section. The separation between first end 20a and first edge 31 and/or the separation between second end 20b and second edge 32 is less than about 0.5 of length L1 of recess 20. The separation may also be less than about 0.4, 0.3, 0.2, or 0.1 of L1.

Lightguide 10 may also include a plurality of light extractors 50 disposed in second lightguide section 40 for extracting light that would otherwise propagate within and along the second lightguide section via total internal reflection (TIR). Light extractors 50 are generally not provided within first lightguide section 30 since there is generally no desire to extract light from this section, but may be so provided depending on the application.

Lightguide 10 may include at least one auxiliary elongated recess 60 formed in second lightguide section 40 for receiving light ray 70 from first lightguide section 30 along a first direction 71 and redirecting the received light via TIR along a different second direction 72 in the second lightguide section. At least one auxiliary elongated recess 60 may be formed in second lightguide section 40 proximate first edge 13 of lightguide 10. There may also be at least one other auxiliary elongated recess 60' formed in second lightguide section 40 proximate opposite second edge 14 of lightguide 10. Auxiliary recess 60 may have a maximum depth hmax that is greater than or equal to 0.5, 0.6, 0.7, or 0.9 of the thickness T of lightguide 10. Depth hmax may also be equal to thickness T, meaning that auxilliary recess 60 may extend through the entire thickness of lightguide 10.

Figure 2:
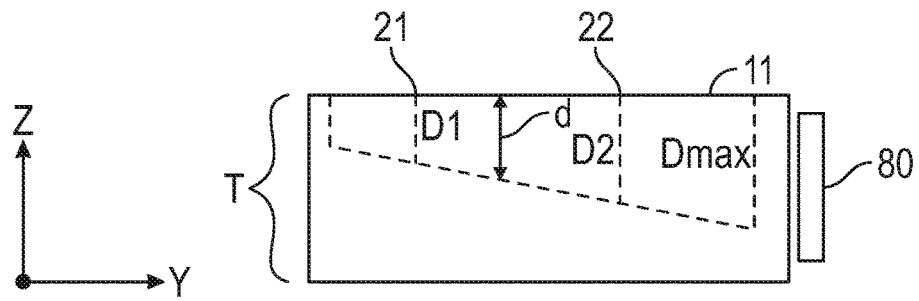
FIG. 2 is a schematic end view of optical system 100 of FIG. 1 facing first section 30.

The depth d of recess 20 varies along its length L1. One illustration of this is provided in FIG. 2, which is a schematic end view of lightguide 10 with first lightguide section 30 facing out of the page. As shown there, recess 20 has first and second depths, D1 and D2, in a thickness direction (z) of lightguide 10 at first and second locations 12 and 22, respectively, along the length of the elongated recess. The ratio of D2/D1 may be greater than or equal to 1.5, 3, 5, or 10. As shown in FIG. 2, recess 20 has a maximum depth Dmax that decreases in depth from the side edge of lightguide 10 facing light source 80 to the opposite edge of the lightguide. Recess 20 is open to first major (top or emission) surface 11 of lightguide 10 and has a depth d that extends toward second major (bottom or back) surface 12 of the lightguide. In that case, D1 and D2 are both less than T. Dmax may be greater than or equal to 0.5, 0.7, or 0.9 times thickness T of lightguide 10. Dmax may also be equal to T, meaning that recess 20 extends through the entire thickness of lightguide 10 from top surface 11 to bottom surface 12 such that the recess is open at both ends at that point. In this case, D2 may be equal to T.

The lightguides described herein may be unitary or non-unitary. As used herein, the term "unitary lightguide" means a lightguide having a construction such that there are no discernible interfaces within the lightguide, such as no discernible interface between the main body of the lightguide and any of its features, such as light extractors 50.

Returning to FIG. 1, optical system 100 may include light source 80 disposed along first edge 31 of first lightguide section 30. A first light ray 73 is emitted by light source 80 and enters first lightguide section 30 through first edge 31.

First light ray 73 exits first lightguide section 30 and enters second lightguide section 40 after being reflected by partial or total internal reflection (TIR) at least once by elongated recess 20. Additionally, some light, such as light ray 70 emitted by light source 80, also enters first lightguide section 30 through first edge 31 but instead exits the first lightguide section and enters second lightguide section 40 without encountering recess 20.

Figure 3:
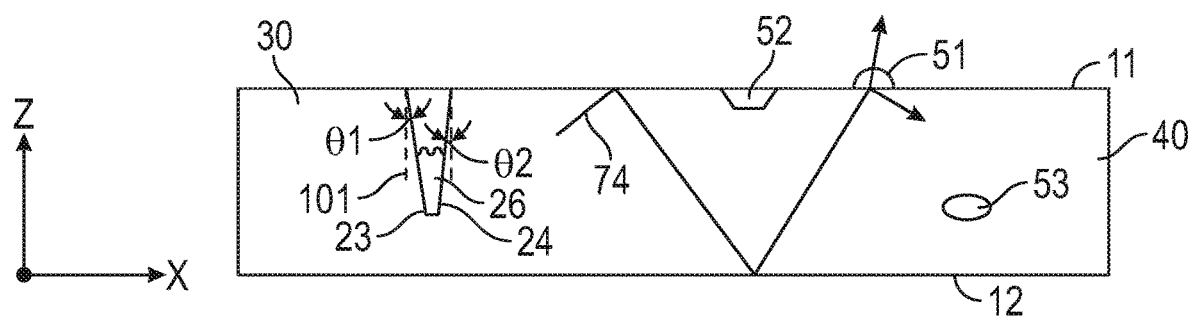
FIG. 3 is a schematic side view of lightguide 10 of FIG. 1 along the length of the lightguide.

FIG. 3 shows a schematic side view of lightguide 10 along its length. As shown in FIG. 3, the light extractors 50 of FIG. 1 may take the form of protrusions 51 on top surface 11, notches 52 in the top surface, and/or light extractors 53 embedded within lightguide 10. Light extractors 50 provide a means for allowing light, such as light ray 74, travelling within lightguide 10 due to total internal reflection (TIR) to exit the lightguide at the desired locations. Light ray 74 propagates within second lightguide section 40 of lightguide 10, reflecting off top and bottom surfaces 11 and 12 before exiting the top surface of the lightguide via protrusion 51 formed on top surface 11. As shown in FIG. 3, recess 20 is formed in top or emission surface 11 and extends toward bottom or back surface 12. Optionally, a filler material 26 may be provided to at least partially fill recess 20. Filler material 26 should have an index of refraction n2 which is lower than the index of refraction n1 of lightguide 10 so as to support partial or total TIR at recess 20.

Figure 9:
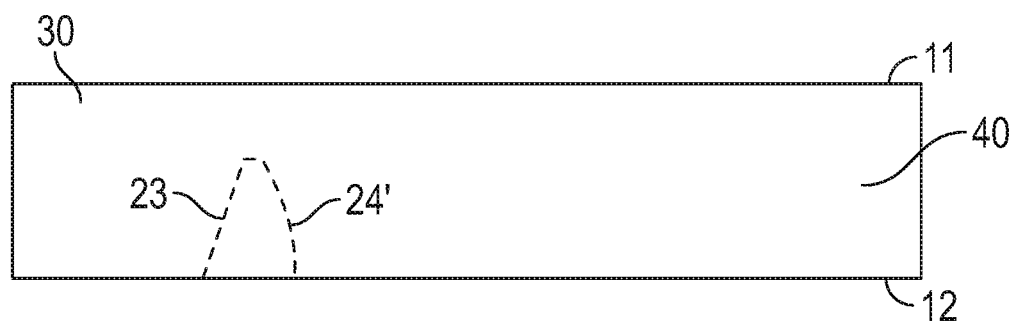
FIG. 9 is a schematic side view of lightguide 10 of FIG. 1 along the length of the lightguide according to another embodiment of the present invention.

As shown in FIG. 3, recess 20 has first and second sides surfaces 23 and 24. Surfaces 23 and 24 form angles θ1 and θ2, respectively, with respect to line 101 which is normal to the plane of lightguide 10. At least one of angles θ1 and θ2 may be less than 30 degrees, or less than 20 degrees. As shown in FIG. 3, one or both surfaces 23 and 24 may be substantially planar. Alternatively, as illustrated in FIG. 9, at least one of the surfaces (as illustrated by surface 24') may be curved.

Figure 4:
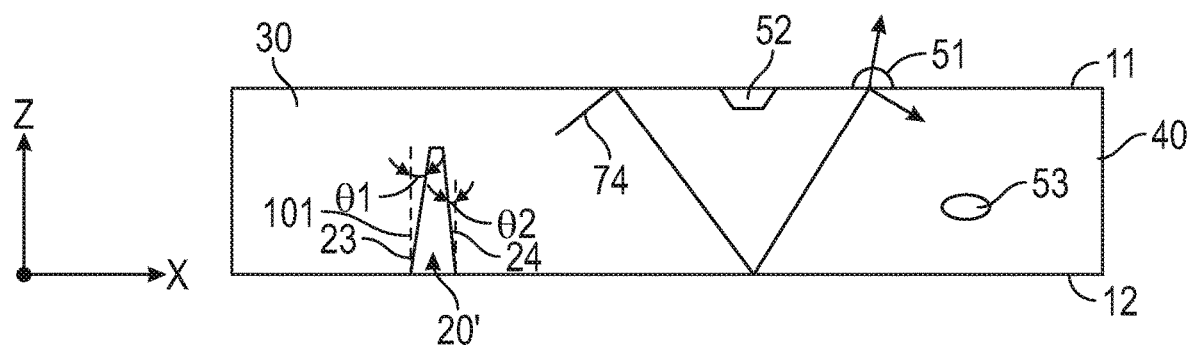
FIG. 4 is a schematic side view of lightguide 10 of FIG. 1 along the length of the lightguide according to another embodiment of the present invention.

FIG. 4 resembles FIG. 3 but shows a recess 20' that is inverted, meaning that instead of the recess having its primary opening in top or emission surface 11 and having is depth approach the bottom or back surface 12, the recess instead is formed in the back surface and has its depth approach the emission surface. Otherwise, the lightguide shown in FIG. 4 is identical to that of FIG. 3 and operates under the same principles of TIR at surfaces 23 and 24 of the recess.

Figure 5A:
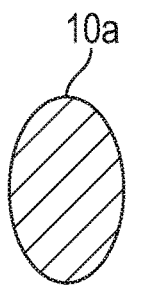
FIGS. 5A-5G show schematic cross-sectional views of lightguide 10 perpendicular to its length according to various embodiments of the present invention.
Figure 5B:
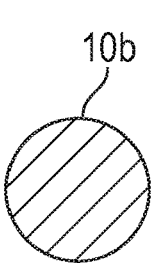
Figure 5C:
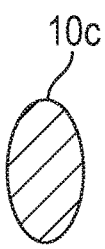
Figure 5D:
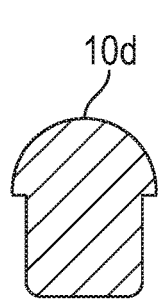
Figure 5E:
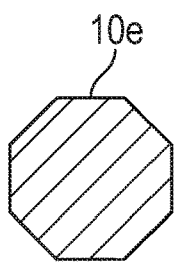
Figure 5F:
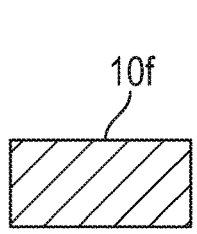
Figure 5G:
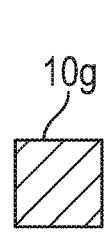

FIGS. 5A 5G show various cross-sectional profiles perpendicular to the length L1 of lightguide 10. FIG. 5A shows a round cross-sectional profile. FIG. 5B shows a circular cross-sectional profile. FIG. 5C shows an elliptical cross-sectional profile. FIG. 5D shows a mushroom-shaped cross-sectional profile. FIG. 5E shows a polygonal cross-sectional profile. FIG. 5F shows a rectangular cross-sectional profile. FIG. 5G shows a square cross-sectional profile. Lightguide 10 may be substantially flat or may be curved in at least one direction. Other geometries and cross-sectional profiles are possible provided that they support total internal reflection within lightguide 10 as needed.

Figure 6A:
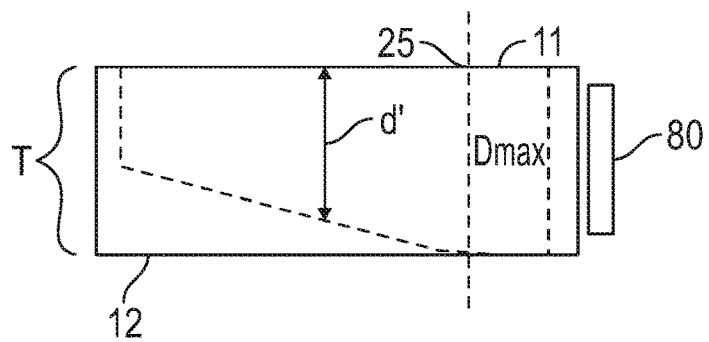
FIGS. 6A-6D show schematic end views of lightguide 10 according to various embodiments of the present invention.

FIG. 6A shows a schematic end view of lightguide 10, with light source 80 shown on the right. Recess 20 (shown in dashed lines) is open to top surface 11, and extends to a depth d' toward bottom surface 12. Vertical line 25 represents one location along the length of recess 20, and may be moved from left to right as shown in FIG. 6A at various locations along the length of recess 20. At the location of vertical line 25 shown in FIG. 6A, depth d' of recess 20 is equal to thickness T of lightguide 10, and therefore reaches bottom surface 12, creating an opening in the bottom surface at that location. As shown in FIG. 6A, depth d' of recess 20 may have a profile that changes linearly along the length of the recess. Depth d' is also shown as continuously varying over at least a portion of the length of recess 20, meaning that the depth of the recess is not constant over at least a portion of the length of the recess, and that over such portion the depth continuously varies (as opposed to a step-wise change in depth).

Figure 6B:
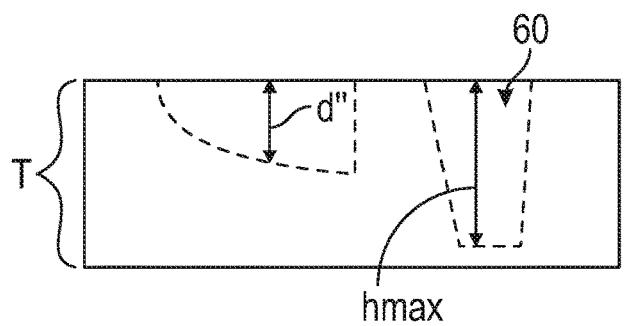
Figure 6C:
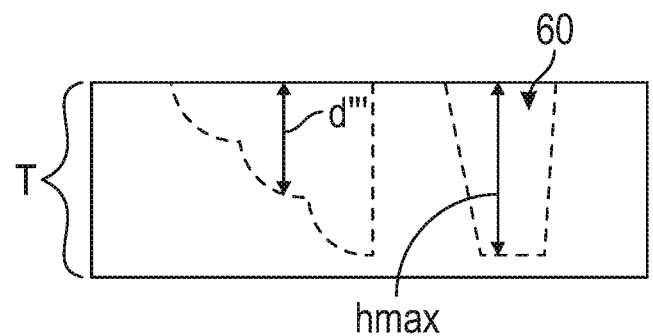

FIG. 6B shows recess 20 having a depth d" that varies along the length of at least a portion of the length of the recess in a curved, non-linear fashion. FIG. 6C shows recess 20 having a depth d''' having piecewise, adjoining, curved surfaces, and therefore having a non-linear depth profile.

Figure 6D:
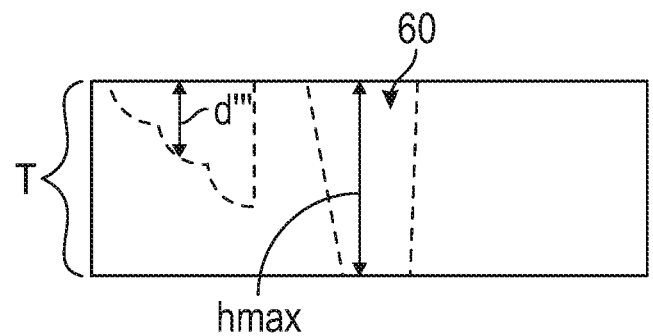

As shown in FIG. 6C, auxiliary elongated recess 60 has a depth hmax extending from top surface 11 of lightguide 10 toward bottom surface 12 of the lightguide. As shown in FIG. 6D, auxiliary elongated recess 60 may have a depth hmax that extends through the entire thickness T of lightguide 20.

Figure 7:
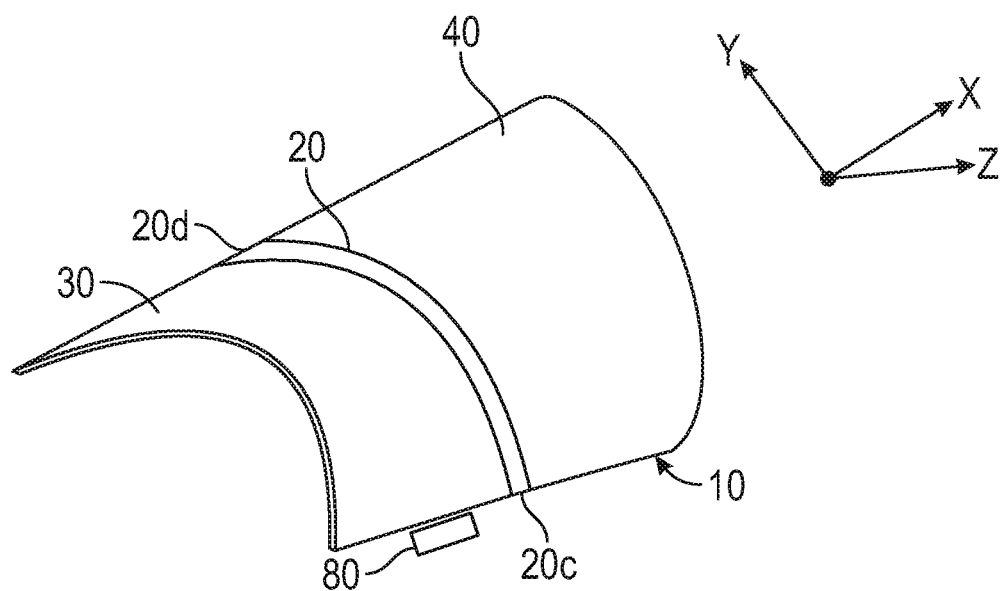
FIG. 7 is a perspective schematic view of optical system 100 according to another embodiment of the present invention.

FIG. 7. shows lightguide 10 having recess 20 with first and second ends 20c and 20d which extend to the edges of the lightguide and are therefore open, in contrast to closed recess ends 20a and 20b of FIG. 1. Another option is to have one of the recess ends be open and the other closed.

Figure 8:
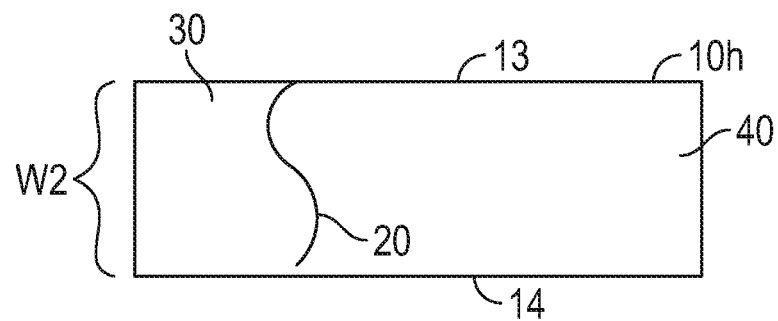
FIG. 8 is a schematic top view of lightguide 10h according to another embodiment of the present invention.

FIG. 8 shows lightguide 10h having recess 20 which is curved. Because of the extreme curve of recess 20, it is possible for the length of the recess to exceed the width W2 of lightguide 10h. In fact the length L1 of recess 10 could be greater than or equal to 1.2 times width W2.

Lightguide 10 (and embodiments 10a-h) can be made from a glass or a polymer, for example. In some embodiments, the lightguide is flexible. For example, a flexible polymer film may be used to form the lightguide. Suitable polymeric materials include acrylates such as polymethyl methacrylate (PMMA), polycarbonate, and polyurethane, for example. The lightguide can be made by first forming the lightguide (e.g., via extrusion or molding) without recess 20, auxiliary elongated recess 60, or light extractors 50, and then creating these features through subsequent processing. These features can be formed by etching, laser ablation, or embossing, for example. Additional processing steps can be applied before or after the features are formed in the lightguide. Alternatively, the lightguide may be made simultaneously with the features in a molding process.

The present invention has several advantages over existing lightguides. For example, often lightguides require multiple LEDs to provide sufficient light and uniform illumination. The use of recess 20 provides a mechanism for distributing the light from the LED enabling the use of a single LED rather than two or more LEDs. Also, often the LEDs are located at one end of the lightguide. The use of recess 20 allows for a configuration where the LED is on the side of the lightguide rather than the end, which may be desirable depending on the space limitations or other constraints on the size and shape of the lightguide.

The inclusion of recess 20 in lightguide 10 also provides an additional degree of design flexibility for light management within the lightguide beyond that provided by extractors 50 and auxiliary elongated recesses 60. As discussed above, this may be done by including recess 20, and by selecting various characteristics for the recess, including its length, its depth, the manner in which the depth varies, the shape of the sides of the recess (curved or straight and the angle of the sides), the spacing between each end of the recess and the closest side of the lightguide, and the shape of the recess along its length (straight, curved, S-shaped, etc.).

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that may vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

Various modifications and alterations of this invention will be apparent to those skilled in the art and it should be understood that this scope of this disclosure is not limited to the illustrative embodiments set forth herein. For example, the reader should assume that features of one disclosed embodiment may also be applied to all other disclosed embodiments unless otherwise indicated.

The invention claimed is:

1. An optical system comprising a lightguide comprising:
an elongated recess formed therein, the elongated recess having a length L1 and a width W1, wherein $L1/W1 \geq 5$, the elongated recess having first and second depths, D1 and D2, in a thickness direction of the lightguide at respective first and second locations along the length of the elongated recess, wherein $D2/D1 \geq 1.5$, wherein the elongated recess divides the lightguide into a first lightguide section having a major surface having an area A1 and a second lightguide section having a major surface having an area A2, wherein $A2 \geq A1$; and
a plurality of light extractors disposed in the second, but not the first, lightguide section of the lightguide for extracting light that would otherwise propagate within and along the second lightguide section;
wherein the lightguide has a width W2 at the elongated recess, such that $L1/W2 > 1.0$.

2. The optical system of claim 1, wherein the lightguide has a thickness T and the elongated recess has a maximum depth Dmax equal to T.

3. The optical system of claim 1, wherein the lightguide comprises an emission surface opposite a back surface, light propagating within and along the second lightguide section and extracted by a light extractor in the plurality of light extractors exiting the lightguide from the emission surface, the elongated recess formed in the emission surface and extending toward the back surface.

4. The optical system of claim 1, wherein the lightguide has an index of refraction n1 and the elongated recess is at least partially filled a filler material having an index of refraction index n2 less than n1.

5. The optical system of claim 1, wherein the elongated recess comprises opposite first and second recess ends, at least one of which is closed.

6. The optical system of claim 1, wherein a depth of the elongated recess varies continuously along at least a portion of the length of the elongated recess.

7. The optical system of claim 1, further comprising a light source disposed along a first edge of the first lightguide section, a first light ray emitted by the light source and entering the first lightguide section through the first edge leaving the first lightguide section and entering the second lightguide section after being reflected at least once by the elongated recess, wherein at least one light ray emitted by the light source and entering the first lightguide section through the first edge leaves the first lightguide section and enters the second lightguide section without encountering the elongated recess.

8. A lightguide comprising an elongated recess continuously extending along a length L1 of the elongated recess from a first end of the elongated recess to an opposing second end of the elongated recess and having a maximum depth Dmax, the lightguide having a thickness T and a width W2 at the elongated recess, L1 is greater than W2 and $Dmax \geq 0.5\,T$, wherein the elongated recess divides the lightguide into a first lightguide section having a major surface having an area A1 and a second lightguide section having a major surface having an area A2, wherein $A2 \geq A1$; and
a plurality of light extractors disposed in the second, but not the first, lightguide section of the lightguide for extracting light that would otherwise propagate within and along the second lightguide section.

9. A lightguide comprising an elongated recess continuously extending along a length L1 of the elongated recess, and having a depth d that increases, from a first end of the elongated recess proximate a first edge of the lightguide to an opposing second end of the elongated recess proximate an opposite second edge of the lightguide; wherein the lightguide has a width W2 at the elongated recess, such that $L1/W2 > 1.0$, wherein the elongated recess divides the lightguide into a first lightguide section having a major surface having an area A1 and a second lightguide section having a major surface having an area A2, wherein $A2 \geq A1$, and
a plurality of light extractors disposed in the second, but not the first, lightguide section of the lightguide for extracting light that would otherwise propagate within and along the second lightguide section.

* * * * *